United States Patent
Wagner

[11] 3,952,401
[45] Apr. 27, 1976

[54] PROCESS FOR INSTALLING FATIGUE-RATED RIVETS

[75] Inventor: David Lee Wagner, Kent, Wash.

[73] Assignee: The Boeing Company, Seattle, Wash.

[22] Filed: June 30, 1975

[21] Appl. No.: 591,971

[52] U.S. Cl............................ 29/522; 29/243.53; 85/37; 52/758 D
[51] Int. Cl.² ................... B21D 39/00; B23P 11/02
[58] Field of Search............ 29/243.53, 243.54, 522, 29/509; 85/37; 52/758 D

[56] References Cited
UNITED STATES PATENTS

| | | | |
|---|---|---|---|
| 2,042,716 | 6/1936 | Johnson | 29/243.53 |
| 2,365,147 | 12/1944 | Speller | 29/243.53 X |
| 2,957,237 | 10/1960 | Regle et al. | 29/522 UX |
| 3,561,102 | 2/1971 | Diemer | 29/522 X |
| 3,562,893 | 2/1971 | Winslow et al. | 29/243.53 |
| 3,747,382 | 7/1973 | McMaster et al. | 29/243.53 X |

FOREIGN PATENTS OR APPLICATIONS

| 420,103 | 10/1925 | Germany | 29/522 |
|---|---|---|---|

Primary Examiner—Charlie T. Moon
Attorney, Agent, or Firm—Glenn Orlob; John M. McCormack

[57] ABSTRACT

A process of forming an interference fit between a rivet and the perimeter of an aperture through which the rivet shank is inserted finds particular application in the aircraft industry where sheets of component materials are joined together as a sheet assembly by a plurality of rivets. The process utilizes a high energy impact gun which forms a button on one end of a rivet shank, the other end of the rivet shank protruding a predetermined distance from a sheet surface and prevented from longitudinal movement by a bucking bar. The impact gun is then activated against the other end to rapidly form a second button. The rivet shank is radially expanded during the riveting process to thereby swell against the perimeter of the rivet hole for compression stressing which serves to stress relieve the area adjacent to the hole during cyclic loading of a sheet assembly.

4 Claims, 3 Drawing Figures

PROCESS FOR INSTALLING FATIGUE-RATED RIVETS

BACKGROUND OF THE INVENTION

A. Field of the Invention

The present invention relates to an apparatus and a method for mechanically riveting sheets of metal or the like together and more particularly, to a process in which a rivet is formed as an interference fit within a hole. The present invention finds particular application in the aircraft industry wherein wing skins, fuselage components, etc. are joined together by a plurality of rivets.

Wing skins and other riveted sections in an aircraft are drilled with a plurality of apertures which provide openings for the insertion of rivets which are upset to join the skins together. Such structures in an aircraft are subjected to cyclic loading through the apertures and therefore the fatigue life may be considerably shortened unless the perimeter of the holes is compression stressed. Compression stressing results when a rivet head or button is formed which causes a corresponding radial expansion of the rivet shank against the perimeter of the rivet hole. This swelling of the rivet shank serves as a means for relieving stresses which would be formed adjacent the hole perimeter (area of high stress concentration) during cyclic loading. The present invention contemplates a novel rivet installation procedure by which the rivets are provided with a button at each end, each button formed by a single impact from a high velocity impact gun to cause the rivet shank to swell within a hole.

The present invention incorporates by reference the high energy pneumatically operable impact gun of copending application, Ser. No. 591,972 filed June 30, 1975. The impact gun therein disclosed is employed as the riveting power source of the present invention which requires that the rivet be upset by a single impact.

B. Description of the Prior Art

Prior art riveting methods for producing fatigue-rated rivets in a sheet assembly generally involve squeezing or impacting procedures. Specifically, hydraulic squeezing may be utilized to expand the rivet shank sufficiently in a rivet hole on installation to effect fatigue life of the assembled structure. However, hydraulic squeezing involves considerable initial monetary investment in the squeezing machine and further requires time-consuming positioning of large, cumbersome wing skins of the like.

A method involving simultaneous impacts has been developed previously by the Boeing Co. (U.S. Pat. No. 3,559,269). This method uses a high energy single impact gun known as the Electro Magnet Riveter (EMR). The EMR gun also requires a high initial investment and a high operation expense due to short coil life and high cost of coils. Furthermore, the EMR must be suspended by a counterbalance system and is therefore not truly portable.

Another method to effect fatigue rating is to cold work a rivet hole with special cold-working equipment prior to installation of a rivet. Such a method is considered less effective and is used as a secondary process only when it is not feasible to employ the above mentioned procedures. Cold-working is time consuming and requires extra man hours as well as additional equipment.

In U.S. Pat. No. 3,609,851, there is disclosed a metal working apparatus and process in which an electromechanical transducer applies energy to a work piece for the deformation of metallic or non-metallic materials in procedures such as riveting, cold heading, bonding and swaging. In one disclosed embodiment, electromechanical energy is applied to a metal insert by downward force of an impact tool. The impact forces the metal insert downward until its extreme end abuts against a recess formed in a back-up mass. By continuing impact, a metal rivet will be deformed until a rivet head is formed between a countersink and a depression. The next step requires that the plate assembly which is to be riveted together be reversed and that the source of static force also be inverted in order that the depression will receive the rivet head previously formed by the cup-shaped depression. Impact is once again continuously applied until the previously formed rivet head seats itself in the depression and the metal rivet deforms on its opposite end until a second rivet head is formed by the depression.

A high impact portable riveting apparatus is disclosed in U.S. Pat. No. 3,559,269. Here, rapidly changing electrical current passing through a coil is converted into a mechanical force acting between a conductor plate on a ram and the coil to propel the ram and its forming surface against a workpiece. A pair of portable electromechanical riveting guns are described along with the electrical system and are interlocked in their operation to insure a simultaneous ram impact on each end of a rivet to be upset. While the system disclosed in this patent provides for the forming of a button on each end of a rivet shank, it can be appreciated that the system is expensive and cumbersome, in that heavy guns are required which utilize an electrical motive source. On the other hand, the present invention provides a process in which a pneumatically operable system is employed to form a button on one end of a rivet shank and then form a button on the other end.

Other patents of relevant interest but not deemed worth of further comment are U.S. Pat. Nos. 2,753,624, 3,135,141 and 3,562,893.

SUMMARY OF THE INVENTION

It is an object of the present invention to provide a process by which fatigue-rated rivets may be expanded within a rivet hole to compression stress the hole so that the structure secured by the rivet may have a longer fatigue life during cyclic loading. If a button is formed on both ends of a rivet, the shank of the rivet will swell and expand so as to compression stress the perimeter of the rivet hole. In order for an efficient production process to take place, the present invention further contemplates that the rivet will be formed with buttons on both ends of the shank by means of a single-impact high energy riveting gun.

A high energy, pneumatically operable impact gun will provide a striking force on the end of a rivet which will move in a short period of time. The rivet heads or buttons thereby formed will be pressed tightly against the outer surfaces of component sheets. The elimination of substantial gaps between the rivet button and the outer surface of a component sheet is an essential object of the present invention.

Another object of the present invention is to provide a process by which a rivet may be secured to a structure with dual buttons by means of only a single high energy impact riveting gun and a single bucking bar. While dual high energy impact guns and bucking bars could be used, the present invention does not require such. Additional objects of the present invention reside in the specific construction of the exemplary process hereinafter particularly described in the specification and shown in the several drawings.

BRIEF DESCRIPTION OF THE DRAWINGS

Novel features of the improved riveting process in accordance with the present invention will be more readily understood from a consideration of the following description, taken together with the accompanying drawings, in which a preferred adaptation is illustrated with the various parts thereof identified by suitable reference characters in each of the views, and in which.

DETAILED DESCRIPTION OF THE INVENTION

Figure 1:
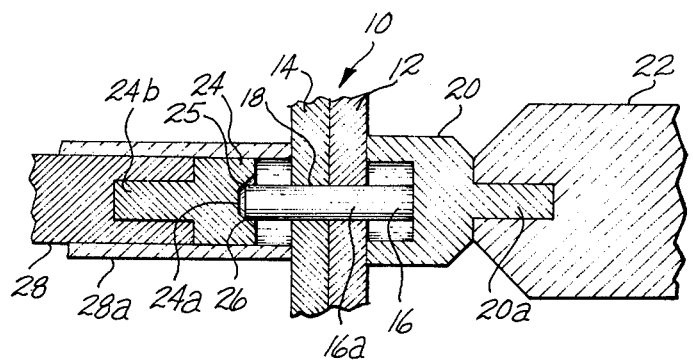
FIG. 1 is a cross-sectional view of the apparatus used in the riveting process of the present invention prior to rivet impact by a high energy riveting gun.

Reference is directed initially to FIG. 1 of the drawings which illustrates the tooling setup used in the process of the present invention. Reference numeral 10 generally designates the setup by which sheet metal skins 12 and 14 are to be secured by a rivet 16. While only one rivet 16 is shown, it is understood that many are used to secure long wing skins, fuselage components and other aircraft sections together. An aperture 18 has a diameter slightly larger than the diameter of rivet 16 in order to permit the rivet to be initially inserted therethrough.

Figure 2:
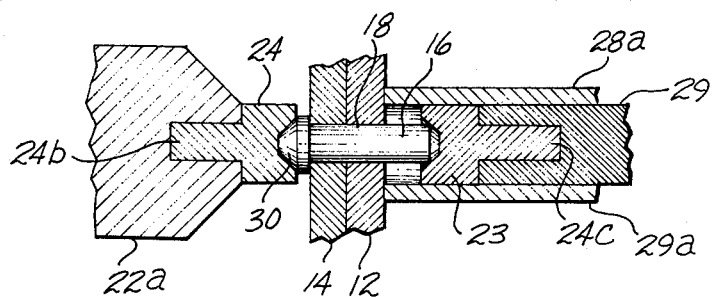
FIG. 2 is a cross-sectional view of the apparatus after a button has been formed on one end of the rivet shank.
Figure 3:
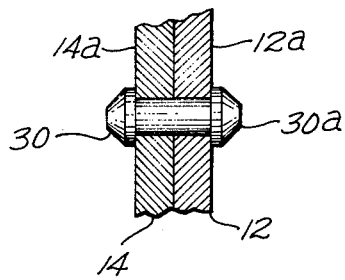
FIG. 3 is a cross-sectional view of the apparatus showing the rivet after buttons have been formed on both ends to rigidly secure two component sheets together.

By additionally referring to FIGS. 2 and 3, the method of forming an interference fit between the shank of rivet 16 and the perimeter of aperture 18 can be more conveniently understood. Rivet shank 16a is prevented from longitudinal movement toward the right by means of an obstruction which may conveniently take the form of a spacer or snap die 20 formed with a projection 20a for reception by a bucking bar 22. Bucking bar 22 is employed as a rigid obstruction sufficient to counteract against rivet 16 from a high energy impact gun generally indicated by tool 28.

Arranged at the other end of rivet 16 is a forming snap die 24. Snap die 24 utilizes a conical forming section 24a having bevels 25 and 26 which determine the shape of buttons to be formed. Forming snap die 24 is also provided with a projection 24b or other convenient means for reception into tool 28. Tool 28 and snap die 24 are slidably disposed in a guide 28a.

Initially, using the configuration illustrated in FIG. 1, the high energy riveting gun (not shown) is actuated forcing tool 28 against snap die 24 to upset in a single impact rivet 16 on the left thereby forming a button 30. Such an impact will radially expand rivet shank 16a, especially in the area adjacent to aperture 18 through sheet 14. The radial expansion will force shank 16a tightly against the perimeter of aperture 18 and thus serve to compression stress the area of sheet 14 (and to a lesser extent, sheet 12) adjacent to the perimeter of aperture 18. This compression stressing will tend to serve as a stress relieving measure of stresses built up around aperture 18 during cyclic loading of the riveted structure.

In order to form a button on the right end of rivet 16, the following additional steps as contemplated by the present invention are effectuated. Snap die 24 is maintained as previously but tool 28 is removed. Thereupon, a further bucking bar 22a is disposed over snap die 24 after guide 28a has been removed. Snap die 20 and bucking bar 22 are replaced with a second forming or snap die 23. Snap die 23 is constructed substantially similar to snap die 24. Another tool 29 (used in conjunction with a high energy impact gun, not shown) is received by projection 24c. Tool 29 and snap die 23 are slidably disposed in a guide 29a.

The right end of rivet 16 is then upset in a single impact upon actuation of the high energy impact gun to form button 30a. The forming of button 30a also radially expands rivet shank 16a to compression stress the perimeter of aperture 18 adjacent to sheet 12 (and to a lesser extent, sheet 14).

FIG. 3 shows the comleted riveted section, and it must be appreciated that gaps, if any, between buttons 30 and 30a and outer surfaces 14a and 12a, respectively, are minimal so as to be within current specifications for fatigue-rated structures. It is of importance that a high energy single impact riveting gun be used to insure radial expansion of the rivet shank. If multiple impacts were to take place, insufficient expansion of the rivet shank would result. The gaps would then have to be covered to peening the button so as to have the appearance of a good tight button, however gaps would still exist.

Furthermore, the mass of bucking bars 22 and 22a must be sufficiently large with respect to the mass of the impacting tools so as to restrict rivet travel during impact so that only a minimal button gap is formed. While high energy single impacts are contemplated as the optimum riveting procedure, a plurality of impacts could also be used in the process of the present invention.

A further advantage in employing a single impact riveting tool resides in the fact that no attempt of synchronization need be made. To elaborate, it is not necessary to have simultaneous impact on both the left and right ends of rivet 16.

Additionally, it must be appreciated that the process of the present invention may be accomplished by either a single or dual use of high energy impact guns. For instance, depending on the size of the panels or sheets to be riveted together, only a single high energy impact gun and bucking bar need be used, as two operators could exchange the tools depending on which end was to be formed with a button. However, in the case of a large panel or sheet structure where exchange of tools would be unnecessarily cumbersome, dual tools may need to be employed.

While a certain exemplary embodiment of this invention has been hereinabove described and shown in the drawings, it is to be understood that such an embodiment is merely illustrative of, and not restrictive on, the broad invention. By way of example, the particular snap die forming sections and bucking bar configurations could be replaced with other equivalent structures to effectuate the process of the present invention in substantially the same way. Thus, the invention should not be limited to the specific construction or arrangement shown and described since various other obvious modifications may occur to persons having ordinary skill in the art.

What is claimed is:

1. A method of forming an interference fit between a rivet shank and the perimeter of an aperture through which the rivet shank is inserted comprising:
preventing the rivet shank from longitudinal movement in a first direction by providing an obstruction adjacent to a first end thereof;
upsetting in a single impact the opposite end of the rivet shank with an impacting means to thereby radially expand the rivet shank against the perimeter of the aperture to compression stress same;
preventing the rivet shank from longitudinal movement in a second direction by providing an obstruction adjacent to the upset opposite end; and
upsetting in a single impact the first end of the rivet shank with an impacting means to thereby radially expand the rivet shank against the perimeter of the aperture to compression stress same.

2. A method as described in claim 1 wherein each of said upsetting steps is effected by pneumatically displacing a cylinder within an impacting tool to form a button on the first and opposite ends of the rivet shank.

3. A method of forming an interference fit between a rivet shank and the perimeter of apertures arranged in components to be assembled together comprising:
inserting the rivet shank through the apertures until a first end of the rivet shank contacts a bucking bar thereby preventing the rivet shank from further movement thereagainst;
arranging a forming die over the opposite end of the rivet shank;
impacting the forming die in a single stroke by means of an impacting tool to thereby upset the opposite end of the rivet shank and radially expand same against the perimeter of the apertures to provide compression stressing;
arranging a second bucking bar over the forming die and removing the first mentioned bucking bar;
arranging a second forming die over the first end of the rivet shank; and
impacting the second forming die in a single stroke by means of an impacting tool to thereby upset the first end of the rivet shank and radially expand same against the perimeter of the apertures to provide compression stressing, each of said impacting steps forming a button on the respective ends of the rivet shank, each of said buttons fitting tightly against respective outer surfaces of the assembled components.

4. A method as described in claim 3 wherein each of said upsetting steps is effected by pneumatically displacing a cylinder within an impacting tool to form the aforementioned buttons.

* * * * *